United States Patent [19]

Mohr et al.

[11] Patent Number: 4,458,005
[45] Date of Patent: Jul. 3, 1984

[54] POLYVINYLMETHYLPHOSPHINIC ACID, PROCESS FOR ITS MANUFACTURE AND USE

[75] Inventors: Dieter Mohr, Wiesbaden; Walter Herwig, Bad Soden; Werner Frass; Gerhard Usbeck, both of Wiesbaden, all of Fed. Rep. of Germany

[73] Assignee: Hoechst Aktiengesellschaft, Frankfurt am Main, Fed. Rep. of Germany

[21] Appl. No.: 391,132

[22] Filed: Jun. 23, 1982

[30] Foreign Application Priority Data

Jul. 6, 1981 [DE] Fed. Rep. of Germany ....... 3126627

[51] Int. Cl.$^3$ ............................................ C08F 130/02
[52] U.S. Cl. ................................. 430/271; 204/159.2; 430/270; 430/302; 526/278
[58] Field of Search ..................... 526/278; 204/159.2; 430/270, 271

[56] References Cited

U.S. PATENT DOCUMENTS

| | | | |
|---|---|---|---|
| 3,108,535 | 10/1963 | Uhlig | 101/149.2 |
| 3,276,868 | 10/1966 | Uhlig | 96/1.5 |
| 3,297,663 | 1/1967 | Herbst | 260/80 |
| 3,440,050 | 4/1969 | Chu | 90/75 |
| 3,519,607 | 7/1970 | Welch | |
| 3,902,976 | 7/1975 | Walls | 204/35 |
| 4,153,461 | 5/1979 | Berghauser | 96/75 |
| 4,173,578 | 11/1979 | Staendeke | 260/502.4 |

FOREIGN PATENT DOCUMENTS

| | | |
|---|---|---|
| 1187100 | 2/1965 | Fed. Rep. of Germany . |
| 2344332 | 3/1975 | Fed. Rep. of Germany . |
| 7731067 | 10/1977 | France . |
| 865046 | 4/1961 | United Kingdom . |
| 933107 | 8/1963 | United Kingdom . |

Primary Examiner—Joseph L. Schofer
Assistant Examiner—Peter F. Kulkosky
Attorney, Agent, or Firm—Schwartz, Jeffery, Schwaab, Mack, Blumenthal & Koch

[57] ABSTRACT

The invention relates to a new phosphorus-containing polymer, polyvinylmethylphosphinic acid. It is prepared by polymerization, preferably catalytic, of vinylmethylphosphinic acid or a salt thereof. The new polymer possesses valuable properties and is used, in particular, in the production of offset printing plates which have a light-sensitive layer.

11 Claims, No Drawings

POLYVINYLMETHYLPHOSPHINIC ACID, PROCESS FOR ITS MANUFACTURE AND USE

BACKGROUND OF THE INVENTION

The present invention relates to a novel polymer, polyvinyl methylphosphinic acid, to a process for its preparation and to its use in the production of offset printing plates.

Organic polymers which are substituted by phosphorus-containing groups, and processes for their preparation are already known. Thus, the preparation of liquid to solid polymers from vinylphosphonic acid dichloride is described in German Pat. No. 1,032,537 (=British Pat. No. 865,046). German Pat. No. 1,106,963 concerns the polymerization of vinylphosphonic acid to give polyvinylphosphonic acid which is obtained as a very viscous to hard, clear and nearly colorless product. It is readily soluble in water, in alcohols and in polyhydric alcohols, such as glycols, glycol ethers, polyglycols or glycerol, and in other solvents, giving more or less viscous solutions. Polyvinylphosphonic acid also possesses marked film-forming properties.

Polymers of this type formed from vinylphosphonic acid have considerable importance as intermediate products for plastics, and also in the preparation of flameproofing agents, textile auxiliaries and wetting agents and emulsifiers. They are also used in the production of coatings on metal surfaces for the purpose of protecting the latter from corrosion (cf. German Pat. No. 1,187,100). Furthermore, polyvinylphosphonic acid has acquired considerable importance in the production of planographic printing plates (offset printing plates).

Plates of this type comprise a layer support on which a radiation-sensitive reproduction layer has been applied, with the aid of which an image of an original is produced by photomechanical means. After the printing form has thus been prepared, the layer support carries the ink-receptive image areas, and, at the same time, on the image-free areas, forms the water-receptive background to the image (non-image areas).

What is required, therefore, from a layer support which is to be suitable for light-sensitive material for the production of a printing plate, is, on the one hand, that the image areas, which have been developed from the copying layer of the material and are to be printed, should adhere very firmly to the latter and, on the other hand, that the layer support constitutes a hydrophilic image background and loses nothing of its effectiveness for repelling oleophilic printing inks under the manifold requirements of the printing process. Therefore, the layer support must also have a surface structure which is always porous to a certain extent, so that its surface can retain sufficient water in order to have a sufficiently repellent action against the printing ink used in the printing process.

The base material used for layer supports of this type can be aluminum, steel, copper, brass or zinc foils. These raw materials are converted into layer supports for offset printing plates by suitable operations, such as graining, dull chromium plating, surface oxidation and/or application of an intermediate layer.

Aluminum, which is nowadays perhaps the most frequently used base material for offset printing plates, is surface-roughened according to known methods by dry brushing, wet brushing, sand-blasting or chemical or electrochemical treatment. In order to increase its abrasion resistance, the roughened substrate can additionally be subjected to an anodizing stage in order to build up a thin layer of oxide.

It is customary according to the state of the art to subject anodized support materials of this type to a further stage of treatment in order to improve the adhesion of the light-sensitive layer, to increase their hydrophilic character and/or to facilitate the possibility of developing the light-sensitive copying layers. Methods such as silicatization (German Offenlegungsschrift No. 2,532,769=U.S. Pat. No. 3,902,976) and treatment with complex fluorides (German Auslegeschrift No. 1,300,415=U.S. Pat. No. 3,440,050) or with polyvinylphosphonic acid (German Pat. No. 1,134,093=U.S. Pat. No. 3,276,868; German Pat. No. 1,621,478=U.S. Pat. No. 4,153,461) are described, inter alia, in the patent literature.

However, the methods described above suffer from disadvantages to a greater or lesser extent, so that the support materials thus prepared often no longer meet the present requirements of offset printing. Thus, after treatment with alkali metal silicates, which results in good capacity for development and hydrophilic character, it is necessary to accept a certain impairment of the stability on storage of light-sensitive layers applied thereto.

Although the use of polyvinylphosphonic acid for the after-treatment of supports results in the printing plates having good properties from the point of view of copying and printing technology, the deposition of polyvinylphosphonic acid on the support material can result in difficulties with respect to production technology. These difficulties are caused by $Al^{3+}$ cations, which can reach the surface in preceding stages of treatment, principally in the anodizing stage in an electrolyte containing $H_2SO_4$ and $Al_2(SO_4)_3$, and which can only be removed with difficulty and incompletely, even by thorough rinsing. Polyvinylphosphonic acid reacts with these $Al^{3+}$ ions to form an extremely sparingly soluble precipitate. This precipitate covers the support in the form of a white dust layer which cannot be removed, even by thorough rinsing. The dust particles can either result in wetting problems at a stage as early as the coating with the light-sensitive layer, or can result later in eruptions of the layer during developing or printing. Problems of this type can only be suppressed by a considerable outlay in terms of production technology.

Support materials which have been treated with polyvinylphosphonic acid tend to be subject to aging phenomena when stored in an uncoated state. These aging phenomena manifest themselves in a decreasing hydrophilic character (a reduction in the ink-repellent action) and in the reduced capacity for development of negative-working, light-sensitive layers which have been applied as a coating only a fairly long time after the preparation of the support.

A further field of use of polyvinylphosphonic acid is as an additive to moistening agents and cleaning agents for the offset printing process, described in German Pat. No. 1,121,632 (=U.S. Pat. No. 3,108,535). Such moistening agents (fountain solutions) must reach the printing plates continuously during the printing process, so that the parts of the plate not to be printed are protected from ink absorption and undesirable water-repellency.

SUMMARY OF THE INVENTION

It is therefore an object of the present invention to provide a novel water-soluble polymer.

It is a particular object of the invention to provide a water-soluble polymer which makes it possible to treat support materials for offset printing plates in such a way that the above-mentioned disadvantages of known treatment agents are avoided or are reduced.

In accomplishing the foregoing objects, there has been provided in accordance with the present invention a polymer material comprised of polyvinylmethylphosphinic acid. This polymer material is characterized as having a melting point between about 240° C. and 245° C. and a reduced specific viscosity between about 3.5 and 5 ml/g.

In accordance with another aspect of the present invention, there has been provided a process for the preparation of polyvinylmethylphosphinic acid, comprising the step of polymerizing monomeric vinylmethylphosphinic acid, and/or a salt thereof, having the formula

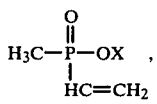

in which X denotes hydrogen or an alkali metal. Optionally, the polymerization is carried out in an inert diluent or solvent, and in the presence of a free radical-generating catalyst and/or under the application of electromagnetic radiation.

Further objects, features and advantages of the present invention will become apparent from the detailed description of preferred embodiments which follows.

DETAILED DESCRIPTION OF PREFERRED EMBODIMENTS

The invention relates to polyvinylmethylphosphinic acid, which is obtained by polymerization of vinylmethylphosphinic acid, which can be prepared by the processes described in German Offenlegungsschriften Nos. 2,344,332 and Nos. 2,646,582.

The polymerization of vinylmethylphosphinic acid is advantageously carried out by warming and/or by irradiation with UV light in the presence of catalysts capable of forming free radicals. The process can be carried out at temperatures between about −10° and +350° C., but, if appropriate, it is also possible to use even higher temperatures, for example, in vacuo or in an inert gas atmosphere. Similarly, if suitable initiation systems and solvents are used, it is also possible to use even lower temperatures. However, if polymerization is carried out using catalysts capable of forming free radicals and/or by irradiation with UV light, the temperature range between about +5° and +130° C. is preferred for carrying out the polymerization.

In some cases, particularly if the vinylmethylphosphinic acid is polymerized mainly by the action of heat, it is advantageous to carry out the reaction at temperatures above about +175° C.

Suitable catalysts are, in particular, compounds which are soluble either in vinylmethylphosphinic acid alone or dissolved in organic solvents or, alternatively, are also soluble in water, for example, peroxides, such as benzoyl peroxide, toluyl peroxide, di-tert-butyl peroxide, chlorobenzoyl peroxide and methyl ethyl ketone peroxide, also organic derivatives of the hydroperoxide, and also hydrogen peroxide, potassium persulfate, percarbonates, azobisisobutyronitrile, sulfinic acids, such as p-methoxybenzenesulfinic acid, isoamylsulfinic acid or benzenesulfinic acid, and, if appropriate, combinations of different catalysts of this type with one another and/or combinations containing rongalite or sulfites. Furthermore, it is possible to additionally employ heavy metal compounds in a suitable soluble form as accelerators.

In general, the catalysts are used in quantities of about 0.01 to 10%, preferably 0.1 to 6%, by weight, relative to the weight of the monomeric vinylmethylphosphinic acid. The polymerization can be carried out as block (bulk) polymerization or polymerization in solution.

It is also possible to polymerize salts of vinylmethylphosphinic acid instead of the free acid. Salts which particularly fall into this category are those which can be prepared by reacting vinylmethylphosphinic acid with the oxides and hydroxides of the alkali metal elements.

If polyvinylmethylphosphinic acid is heated in a capillary tube, the formation of condensate on the upper, cold part of the tube manifests itself at temperatures from 160° to 230° C. At 240° to 245° C., polyvinylmethylphosphinic acid melts to give a clear melt. If the temperature exceeds 280° C., decomposition takes place with the formation of a dark coloration.

The relative viscosity of a 5% strength solution of polyvinylmethylphosphinic acid in a 10% strength sodium chloride solution at 25° C. is 5.8, measured in an Ubbelohde viscometer. The RSV values (=reduced specific viscosity) determined are within the range between about 3.5 and 5.0 ml/g.

Polyvinylmethylphosphinic acid (PVMPA) is readily soluble in water. In contrast with polyvinylphosphonic acid, which only forms salts readily soluble in water with monovalent cations, products of the reaction of polyvinylmethylphosphinic acid with monovalent, divalent and polyvalent cations, such as, for example, $Na^+$, $K^+$, $NH_4^+$, $Et_4N^+$, monodiazonium cations, bisdiazonium cations, polydiazonium cations, $Mg^{++}$, $Ca^{++}$, $Ba^{++}$, $Fe^{++}$ or $Co^{++}$, are readily soluble in water. Although the products of the reaction with trivalent cations, such as, for example $Al^{3+}$ or $Fe^{3+}$, are less readily soluble than those with monovalent or divalent cations, they still exhibit a pronounced solubility in water. As a result of the distinctly higher solubility of the aluminum compounds of polyvinylmethylphosphinic acid, compared with the corresponding polyvinylphosphonic acid compounds, the precipitate mentioned intially is not formed if polyvinylmethylphosphinic acid is used in the dipping treatment of layer supports for offset printing plates.

In the preferred field of application, i.e., the treatment of substrates for producing layer supports for lithographic printing plates, polyvinylmethylphosphinic acid is preferably used in aqueous solution in a concentration of from about 0.1 to 1%.

The treatment with polyvinylmethylphosphinic acid is advantageously accomplished by dipping the substrate or by passing the substrate strip through a bath of this solution. Temperatures of from about 20° to 95° C., preferably about 26° to 70° C., and residence times of from about 2 seconds to 10 minutes, preferably about 10 seconds to 3 minutes, are the most advantageous for practical use in this process. Increasing the temperature of the bath promotes the chemisorption of the polyvinylmethylphosphinic acid on the substrate. This makes it possible, particularly in the treatment of a strip, to reduce the residence times considerably. The dipping treatment is followed by a stage involving rinsing with water. The substrate which has been treated in this way is then dried at temperatures from about 110° to 130° C.

The decisive advantage which this new polymer offers, compared with polyvinylphosphonic acid, is that application to the pretreated substrate is considerably facilitated. As a result of the very much higher solubility of the products of the reaction of polyvinylmethylphosphinic acid with aluminum ions (a higher solubility product), the troublesome precipitate mentioned above is not formed (in contrast with the use of polyvinylphosphonic acid) when an aluminum sheet contaminated with aluminum ions is subjected to treatment. Aluminum supports which have been treated with polyvinylmethylphosphinic acid surprisingly exhibit a distinctly increased stability on storage in an uncoated state, compared with supports treated with polyvinylphosphonic acid. This opens up possibilities of also employing support materials treated in this way for the "wipe-on process", i.e., the multiple use for several printing plates of a layer support in which the light-sensitive coating has been renewed.

Further possible uses of polyvinylmethylphosphinic acid, in particular as a constituent of products of a complex-type nature containing divalent and polyvalent metal cations, are described in German patent application No. P 31 26 636.3 (corresponding to U.S. patent application Ser. No. 391131, filed concurrently herewith).

In summary, it can be stated that support materials which have a thin surface layer of polyvinlymethylphosphinic acid are distinguished by a good hydrophilic character, good promotion of adhesion to the copying layers and a good behavior in terms of copying and printing technology, and can be prepared considerably more easily.

EXAMPLES

The measurement data quoted in the examples correspond to the dimensions of the international SI system. Unless a special note is made to the contrary, the percentage data are quoted in percent by weight. The parts by weight and parts by volume data are in the same relationship to one another as the g to the cm$^3$. The viscosity data "relative viscosity" and "RSV" (=reduced specific viscosity) are the data which are customary in the specialized literature for characterizing polymeric compounds; in this respect cf. particularly G. Schulz, Die Kunststoffe, ("Plastics"), Carl Hanser Verlag, Munich, 1959, page 143.

EXAMPLE 1

150 ml of anhydrous ethyl acetate were initially introduced, under Argon as a protective gas, into a four-necked flask, equipped with a propeller stirrer, a dropping funnel, a reflux condenser and a thermometer. Separately, 4.8 g of azobisisobutyronitrile were dissolved in 100 ml of anhydrous ethyl acetate. After filtering off a few undissolved small particles, 160 g of methylvinylphosphinic acid were added to this solution, which was diluted with a further 50 ml of ethyl acetate, and the solution was poured into the dropping funnel. The contents of the dropping funnel were added, at a uniform rate, in the course of 3 hours, to the ester in the round-bottomed flask, which was heated to a boil and stirred. After approximately 20 minutes the polymer began to be precipitated as a fine, white powder. When the dropwise addition was complete, the reaction mixture was heated under reflux for a further hour, while stirring at a uniform rate. The finely crystalline powder was filtered off with suction on a glass frit at room temperature, washed 3 times with a few ml of ice-cold ethyl acetate and dried rigorously in vacuo at room temperature.

The yield of 141.5 g corresponded to 88.4% of theoretical. A further 4.6 g of the polymeric acid were obtained by concentrating the mother liquor to one half of its volume, so that the total yield corresponded to 91.3% of theoretical.

The final liquor contained oligomeric oils which were not characterized in greater detail.

The acid groups were titrated by dissolving, in parallel batches, analytically pure samples of methylvinylphosphinic acid (MVPA) and polyvinylmethylphosphinic acid (PVMPA) in water and adding excess 0.1 N NaOH. These solutions were then back-titrated against phenolphthalein with 0.1 N HCl. The following results were obtained, relative to the content of OH groups to be expected from theory:

| | Percentage of OH groups, measured by titration | |
|---|---|---|
| MVPA | 98.04%; | 98.46% |
| PVMPA | 85.42%; | 84.65% |

The results of smaller batches (1a, 1b and 1c) are shown in the table:

TABLE 1

| | PHOSPHINIC ACID (g) | ETHYL ACETATE (ml) | AIBN (g) | AIBN RELATIVE TO MONOMER (%) | REACTION TIME (hours) | YIELD OF POLYMER (%) | RSV |
|---|---|---|---|---|---|---|---|
| 1a | 2 | 5 | 0.05 | 2.5 | 3.5 | 68.5 | |
| 1b | 20 | 50 | 0.3 | 1.5 | 5 | 54.2 | 4.7 |
| 1c | 20 | 50 | 0.6 | 3.0 | 5 | 81.1 | 4.3 |

EXAMPLE 2

A bright-rolled aluminum strip 0.3 mm thick was degreased with an alkaline pickling solution (an aqueous solution of 20 g of NaOH per liter of solution) at an elevated temperature of about 50° to 70° C. The electrochemical roughening of the aluminum surface was effected in an alternating current apparatus set up in accordance with the teaching of German Auslegeschrift No. 2,234,434, and in an electrolyte containing HNO$_3$. A surface roughness having an R$_z$ value of 6 μm was obtained thereby. The subsequent anodic oxidation was carried out in accordance with the process described in German Offenlegungsschrift No. 2,811,396, in an electrolyte containing sulfuric acid. The weight of the oxide layer was 3.0 g/m$^2$.

The aluminum strip which had been prepared in this way was then passed through a bath warmed at 60° C. and composed of a 0.5% strength solution of polyvinylmethylphosphinic acid. The residence time in the bath was 20 seconds. The excess solution was then removed with water in a rinsing stage, and the strip was dried with hot air at temperatures between 100° and 130° C.

Lithographic printing plates were prepared by coating this support with the following solution and drying:

0.7 part by weight of the polycondensation product formed from 1 mole of 3-methoxydiphenylamine-4-diazonium sulfate and 1 mole of 4,4'-bis-methoxymethyldiphenyl ether, precipitated in the form of the mesitylenesulfonate, 3.4 parts by weight of 85° strength phosphoric acid, 3.0 parts by weight of a modified epoxide resin, obtained by reacting 50 parts by weight of an epoxide resin having a molecular weight less than 1,000 and 12.8 parts by weight of benzoic acid in ethylene glycol monomethyl ether, in the presence of benzyltrimethylammonium hydroxide, 0.44 part by weight of finely ground Heliogen Blue G (C.I. 74,100).

62.0 parts by weight of ethylene glycol monomethyl ether, 30.6 parts by weight of tetrahydrofuran, and 8.0 parts by weight of ethylene glycol methyl etheracetate.

After exposure through a negative mask, developing was carried out with a solution of:

2.8 parts by weight of $Na_2SO_4.10\ H_2O$, 2.8 parts by weight of $MgSO_4.7\ H_2O$, 0.9 part by weight of 85% strength orthophosphoric acid, 0.08 part by weight of phosphorous acid, 1.6 parts by weight of a nonionic wetting agent, 10.0 parts by weight of benzyl alcohol, 20.0 parts by weight of n-propanol, and 60.0 parts by weight of water.

The printing plate thus prepared could be developed rapidly and free from haze. The non-image areas were distinguished by a very good ink-repellent action. Measurement of the angle of contact with a drop of water gave a value of 43° for uncoated material. The printing run of the printing form thus produced was 200,000 prints.

EXAMPLE 3

An aluminum strip which had been treated in accordance with Example 2 was coated with the following solution:

6.6 parts by weight of a cresol/formaldehyde novolak having a softening range of 105° to 120° C. as specified in DIN 53,181, 1.1 parts by weight of 4-(2-phenylprop-2-yl)-phenyl 1,2-naphthoquinone-2-diazide-4-sulfonate, 0.6 part by weight of 2,2'-bis-(1,2-naphthoquinone-2-diazide-5-sulfonyloxy-1,1'-dinaphthylmethane, 0.24 part by weight of 1,2-naphthoquinone-2-diazide-4-sulfonyl chloride, 0.08 part by weight of Crystal Violet, and 91.36 parts by weight of a solvent mixture composed of 4 parts by volume of ethylene glycol monomethyl ether, 5 parts by volume of tetrahydrofuran, and 1 part by volume of butyl acetate.

The coated strip was dried in a drying tunnel at temperatures of up to 120° C. The printing plates thus prepared were exposed under a positive original and were developed with a developer of the following compositions:

5.3 parts by weight of sodium metasilicate .9 $H_2O$, 3.4 parts by weight of trisodium phosphate .12 $H_2O$, 0.3 part by weight of anhydrous sodium dihydrogen phosphate, and 91.0 parts by weight of water.

The printing forms obtained were faultless from the point of view of copying and printing technology.

The non-image areas had a good ink-repellent action, which manifested itself in the printing form having a rapid run-off in the printing machine. The printing run was over 100,000.

EXAMPLE 4

An aluminum sheet treated in accordance with Example 2 was coated with the following solution:

10 parts by weight of 2,5-bis-(4'-diethylaminophenyl)-1,3,4- oxdiazole, 10 parts by weight of a copolymer of styrene and maleic anhydride having an average molecular weight of 20,000 and an acid number of 180, and 0.02 part by weight of Rhodamin FB (C.I. 45,170) in 300 parts by weight of a mixture composed of 3 parts by volume of tetrahydrofuran, 2 parts by volume of ethylene glycol monomethyl ether and 1 part by volume of butyl acetate.

The layer was given a negative charge of about 400 volts in the dark by means of a corona discharge. The charged plate was exposed in a reprographic camera and was then developed with an electrophotographic suspension developer which had been obtained by dispersing 3.0 g of magnesium sulfate in a solution of 7.5 g of pentaerythritol resin ester in 1,200 ml of an isoparaffin mixture having a boiling range of 185° to 210° C. After the excess developer liquid had been removed, the plate was immersed for 60 seconds in a solution composed of:

35 parts by weight of sodium metasilicate . 9 $H_2O$, 140 parts by volume of glycerol, 550 parts by volume of ethylene glycol, and 140 parts by volume of ethanol.

The plate was then rinsed with a vigorous stream of water, in the course of which the areas of the photoconductor layer which were not covered with toner were removed. The plate was then ready for printing.

The planographic printing form thus produced had a very good ink-repellent action in the non-image areas.

COMPARATIVE EXAMPLE C1

An aluminum sheet which had been electrochemically roughened and anodized as specified in Example 2 was immersed in a 0.5% strength aqueous solution of polyvinylphosphonic acid for 30 seconds at 55° C. The excess solution was then removed with water in a rinsing stage, and the substrate was dried with hot air at temperatures between 100° C. and 130° C. For the preparation of lithographic printing plates, this support was coated with the light-sensitive layer described in Example 2, and the further processing was carried out as specified therein. Measurement of the angle of contact with a drop of water gave a value of 47° for the uncoated material. If the support material was stored over a period of three months, the value increased to 63°, whereas, in the case of a material which had been treated with polyvinylmethylphosphinic acid, the value measured after three months was 49°, i.e., the angle of contact had remained almost unchanged during the storing period.

What is claimed is:

1. A polymer material comprised of polyvinylmethylphosphinic acid.

2. A polymer material as defined in claim 1, having a melting point between about 240° C. and 245° C. and a reduced specific viscosity between about 3.5 and 5 ml/g.

3. A polymer material as defined in claim 1, wherein a 5% solution of the polymer in a 10% sodium chloride solution at 25° C. has a relative viscosity of 5.8.

4. A process for the preparation of polyvinylmethylphosphinic acid, comprising the step of polymerizing monomeric vinylmethylphosphinic acid, and/or a salt thereof, having the formula

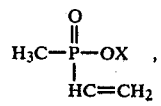

in which X denotes hydrogen or an alkali metal.

5. A process as defined in claim 4, wherein said polymerization is carried out in an inert diluent or solvent.

6. A process as defined in claim 5, wherein an anhydrous organic solvent comprising an aprotic, polar organic solvent is used for the polymerization.

7. A process as defined in claim 4, wherein said polymerization is carried out in the presence of a free radical-generating catalyst.

8. A process as defined in claim 4, wherein said polymerization is carried out under the application of ultraviolet radiation.

9. A process as defined in claim 4, wherein said polymerization is carried out at a temperature between about −10° C. and 350° C.

10. A process as defined in claim 7 or 8, wherein said polymerization is carried out at a temperature between about 5° C. and 130° C.

11. A lithographic printing plate comprised of a layer support, at least one hydrophilic layer comprising polyvinylmethylphosphinic acid and at least one radiation-sensitive reproduction layer applied to said hydrophilic layer(s).

* * * * *